Oct. 8, 1968  E. P. LAUG  3,405,252

BAKE UNIT BAFFLE

Filed Oct. 25, 1966

INVENTOR.
Ernst P. Laug
BY
Attorney

United States Patent Office 3,405,252
Patented Oct. 8, 1968

3,405,252
BAKE UNIT BAFFLE
Ernst P. Laug, Park Ridge, Ill., assignor to General Electric Company, a corporation of New York
Filed Oct. 25, 1966, Ser. No. 589,272
6 Claims. (Cl. 219—399)

This invention relates to cooking ovens, and more particularly to a cooking oven of the electric type wherein an electric heating element is positioned adjacent and above the bottom wall of the oven.

Cleanability of domestic cooking ovens is becoming an important factor, frequently considered as a major one by purchasers of such articles. One means of obtaining cleanability in such ovens is to provide the oven walls with a surface coating which has a very low degree of adhesion to food soils. This then makes it possible to clean such ovens merely by washing the walls thereof with a detergent solution. When the walls include removable panels, as is sometimes the case, a simple cleaning operation at a sink, or in a dishwasher, can then achieve the desired result quickly and easily. While this has been found to be a good solution for the side and back walls of ovens, considerable difficulty has been encountered in applying this to the bottom wall, which of course also receives a fairly high degree of food soil. This difficulty arises because the best known types of coating material (as far as low adhesion to food soil is concerned) tend to degrade, or decompose, at the temperatures reached in the general vicinity of the heat source. It has been particularly pronounced in the case of electric ovens, where there is conventionally an electric heating unit provided in a plane close to and above the bottom wall.

It is therefore an object of my invention to provide an arrangement whereby a coating of the aforementioned type may be used on the bottom wall of an electric oven and suitable protection is provided so that the bottom wall will not reach temperature at which the coating tends to degrade.

A more specific object of my invention is to achieve the above goal by providing a baffle structure between the electric heating element and the bottom wall, wherein the baffle structure is close enough to the heating element to be self-cleaning by pyrolysis, and is sufficiently wide to increase the minimum angle and distance at which the heating unit can radiate energy to the bottom wall.

In one aspect thereof, my invention contemplates the provision of an oven having, in the conventional way, top, bottom, front, back and side walls forming a cooking enclosure, with one of the walls, generally the front one, being removable so as to provide access to the enclosure. While the side and back walls may be provided with a coating of a smooth, easily-cleaned material, such as polytetrafluoroethylene, it is of particular significance in the present invention that the bottom wall of the oven cavity may be so provided. It is well known, to those in the art, that materials such as polytetrafluoroethylene, while having advantages from the viewpoint of cleanability, do have the characteristic that they degrade and are destroyed at temperatures substantially lower than most mineral substances. For instance, it is considered desirable to keep the highest temperature reached by polytetrafluoroethylene in use to about the 570° to 600° F. range.

The oven includes a sheathed electric resistance heating unit, which is positioned in a plane substantially parallel to and closely spaced above the bottom wall. The heating unit has a high emissivity surface so that a substantial amount of heat energy is radiated therefrom. Rigidly secured to this heating unit, therebeneath, is a generally flat baffle of heat resistant material, such as stainless steel, having an emissivity substantially lower than that of the heating unit.

The baffle is positioned close enough to the heating unit so that, during a heating operation, the baffle reaches a temperature where pyrolysis keeps it clean. In addition, the width of the baffle increases the minimum angle at which the heating unit can radiate to the bottom wall sufficiently to decrease the maximum temperature of the bottom wall substantially. As a result, all of the bottom wall remains below the temperature at which the easily-cleaned material is degraded. The bottom wall may be in the form of a removable panel which is coated with the easily-cleaned material.

The features of my invention which I believe to be novel are set forth with particularity in the appended claims. My invention, itself, however, both as to organization and as to method of operation, together with further objects and advantages thereof, may be best understood by reference to the following detailed description taken in conjunction with the accompanying drawing.

In the drawing, FIGURE 1 is a view in perspective, partly broken away, showing an oven incorporating my invention.

Figure 1:
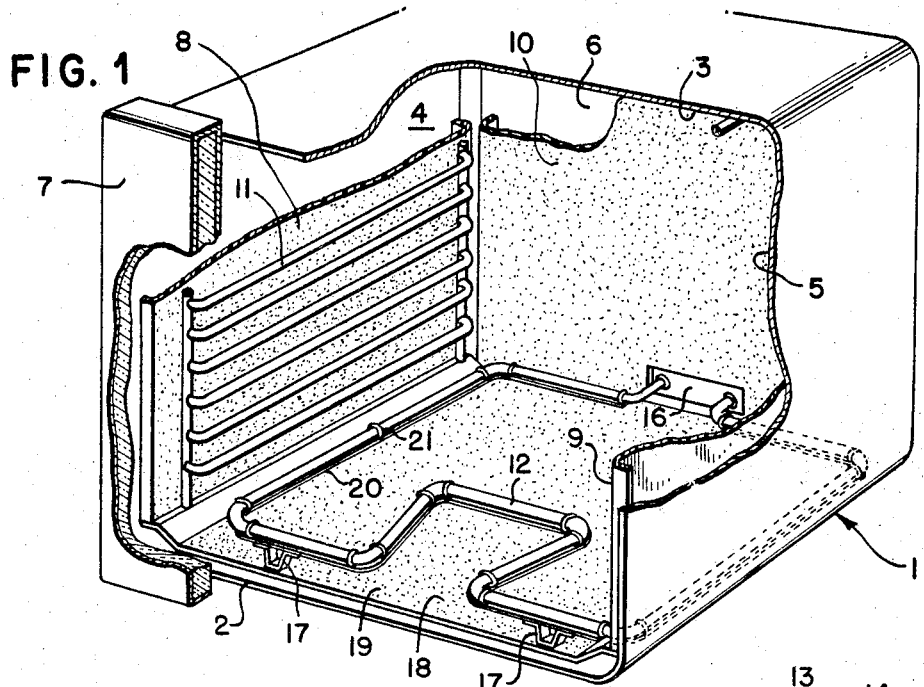
Figure 2:
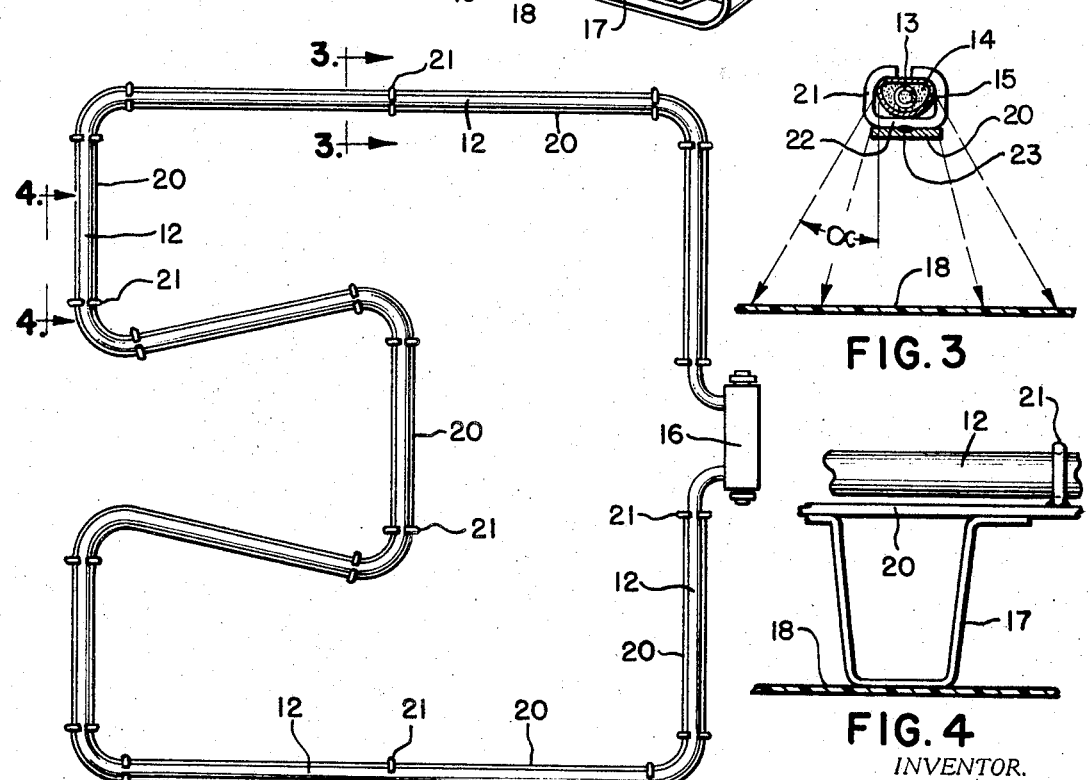
FIGURE 2 is a plan view of the heating unit and baffle arrangement of my invention.

Referring now to FIGURE 1 of the drawing, there is shown a cooking oven, generally indicated by the numeral 1, of the type which is conventionally enclosed in a cabinet (not shown) for use in the kitchen of a residence. The oven compartment is formed by a bottom wall 2, a top wall 3, side walls 4 and 5, a back wall 6, and a front wall 7 in the form of a door pivotable about its base so that a front opening 8 may be provided for access into the oven. In the vertical position, door 7 acts as a wall to close the oven compartment; when it is pivoted to its open position, it provides access as described.

The side and back walls 4, 5, and 6 of the oven may include removable panels 8, 9, and 10 respectively, so that food soils are deposited on these panels rather than on the immovable surfaces behind them. The panels, when soiled, may then be removed from the oven to facilitate cleaning.

Panels 8, 9, and 10 are preferably covered with a suitable material to facilitate the cleaning thereof, it being well-known that different materials have different tendencies to adhere to food soils. One of the preferred materials is polytetrafluoroethylene, an organic compound having a high resistance to adhesion with food soils; with this material, generally, sponging with water and a detergent is all that is required to keep an article clean.

Materials such as polytetrafluoroethylene, being organic, have a substantially lower permissible temperature to ensure an adequate operating life than is the case where a coating is formed primarily of mineral constituents. In the particular case of polytetrafluoroethylene, it is desirable that the maximum temperatures reached by the material be kept in the range of 570-600° F. If the temperature is allowed to go above this range, the material has a tendency to degrade with undesirable rapidity; at temperatures substantially above the range, it decomposes with the result that replacement of the coated panel becomes necessary.

The panels 8, 9, and 10 may be held in place by any suitable means. In the present case, I prefer that they be held in place by wire structures 11 which, in addition to performing the supporting function for the panels, also provides support for suitable rack elements (not shown) which are conventionally included so as to support vessels for cooking operations.

In order to provide heat during cooking operations in an electric oven, an electrical resistance heating unit 12 is provided. Unit 12 has a configuration appropriate to provide heat substantially over all of the bottom surface of the oven. As shown, it may be of the conventional sheathed type wherein, referring to FIGURE 3 in particular, a coiled resistance heating wire 13 is packed in magnesium oxide 14, a heat-conductive electrically-insulating material. The magnesium oxide and the resistance wire are encased in a sheath 15 of an appropriate steel alloy, having its outer surface treated to provide maximum emissivity, conventionally by a simple annealing operation. Sheath 15 preferably has a D-shaped cross section (FIGURE 3) positioned so that the flat part of the D faces up into the oven, and the curved part faces bottom wall 2.

The heating unit 12 is connected at its ends to a terminal block 16 which is then connected, in a conventional manner (not shown) to a suitable source of energy, so that electrical current (of either the 120 or 240 volt alternating current type) may be utilized to energize wire 13. This wire becomes red hot and transmits its heat through the magnesium oxide to sheath 15. The sheath then radiates the heat energy into the oven cavity. The front of the heating unit 12 may be supported by members 17, the members 17 and the electrical connection 16 cooperatively supporting the unit 12 in a plane slightly above and parallel to the upper surface 18 of the bottom wall 2. In one conventional design, the unit 12 is supported 1⅛ inches above the surface 18, and is pivotable about its rear, so that it may be swung up for cleaning the bottom wall 2.

As with the back and side walls, the cleaning of the bottom wall is facilitated if a removable panel is included so that, when heating unit 12 is tilted up, the panel may be removed for cleaning at a sink or a dishwasher. In this connection, the upper surface 18 of the bottom wall 2 is actually the surface of a removable panel member 19. Although such removable panel members are not a new item, it has heretofore been feasible only to make them from a mineral composition, such as, for instance, nickel-chrome. One of the prime objects of my improved structure is to permit the use of polytetrafluoroethylene for removable panel 19 so that the cleanability thereof may be increased even further.

The difficulty heretofore has been that, because of the proximity of heating element 12, the panel surface 18 could not be coated with polytetrafluoroethylene because the temperature in the vicinity of the heating element would substantially exceed the 570 to 600° F. range which is considered desirable. In order to overcome the problem of excessively high temperatures at surface 18, and to do so both economically and effectively, I provide a flat baffle 20 whose dimensions, positioning, and composition are significant to the accomplishment of my objectives. The purpose of the baffle 20 is to constitute a barrier between sheath 15 of heating unit 12 and surface 18, so that heat cannot be radiated straight from the sheath but rather must pass at an angle which is sufficient to decrease substantially the total amount of radiant energy reaching surface 18.

To illustrate this point, if the angle α (FIGURE 3) is changed from 0° to 15°, only 90% as much radiant energy reaches surface 18. If angle α is decreased to 30°, less than two thirds of the radiant energy reaches surface 18. By making baffle 20 about the same width as the heating element, or else very slightly wider, and because of the curved nature of the underside of sheath 15, the radiant heat emanating from unit 12 is caused to take an angle α approaching 30°. This has been found effective to reduce the energy radiated to surface 18 so much that the temperature of the bottom wall surface 18 adjacent to the heating unit remains at or below 550° F. in a conventional oven such as that described. Without the baffle, the temperature directly beneath unit 12 rises to 700° F. or more.

The baffle, as stated, is quite narrow, being of the same overall width or very slightly wider than the heating unit. This, in turn, causes it to be almost unnoticeable to the user of the oven. In the specific structure shown, a baffle having a width of ⅜" and which, of course, followed the contour of element 12 over the entire length thereof which radiates heat, was found to provide the desired results.

Figure 3:
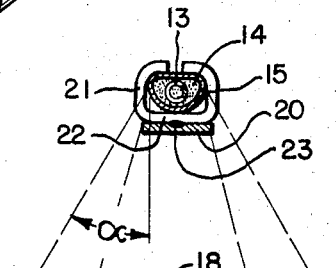
FIGURE 3 is a view along line 3—3 in FIGURE 2.
Figure 4:
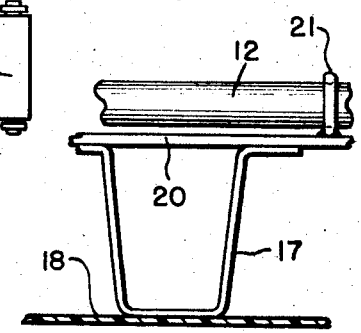
FIGURE 4 is a view along line 4—4 in FIGURE 2.

The baffle may be secured to the heating unit by providing metal clips 21 at regular intervals, and by spot-welding the baffle to the bottom 22 of the clip as shown at 23 in FIGURE 3. The baffle should be of a highly heat resistant material. It has been found that conventional stainless steel of the standard 18% chrome, 8% nickel composition is a suitable material to use for the purpose, being both heat resistant and attractive in appearance.

There is a further important point for the proportioning and the relationships of the elements in my invention. The baffle 20 is positioned close enough to heating element 12 so that it is raised to a temperature substantially over 750° F., generally on the order of 900° F. This can readily be effected by positioning it at a mean distance of ⅛ inch, since the sheath reaches a temperature of 1500 degrees F. during ordinary operation. The temperature of 900° F. is in the range where pyrolysis occurs; as a result, the baffle is "self-cleaning" because chemical decomposition of any food soils which may land on it results in cleaning of the baffle each time unit 12 is used.

In summary, my structure permits the use of a coating material on panel 19 such as polytetrafluoroethylene, and this is achieved by a relatively simple and economical structure, which, in addition to providing the desired goal, is self-cleaning and therefore requires no attention and will not detract, even after a long period of service, from the appearance of the structure.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such equivalent variations as fall within the true spirit and scope of my invention.

What I claim as new and desire to secure by Letters Patent of the United States is:

1. An oven comprising:
   (a) top, bottom, back, side and front walls forming an oven cavity, wherein one of said walls is removable to provide access to said cavity, said bottom wall having a coating of smooth, easily-cleaned material which is degraded by application of excessive heat;
   (b) a sheathed electric heating unit positioned in a plane substantially parallel to and closely spaced above said bottom wall, said unit having a high emissivity surface;
   (c) and a generally flat baffle of heat-resistant material having an emissivity substantially lower than said heating unit, said baffle being rigidly secured to said heating unit therebeneath close enough to be heated to a temperature where pyrolysis keeps said baffle clean, said baffle having a width which increases the minimum angle at which said heating unit can radiate to said bottom wall sufficiently to keep the temperature of said bottom wall adjacent to said heating unit below the temperature at which said material is degraded.

2. The oven defined in claim 1 wherein said front wall is formed as a door, and is movable to provide access to said cavity.

3. The oven defined in claim 1 wherein said baffle is formed of stainless steel.

4. The oven defined in claim 1 wherein said coating of easily-cleaned material is polytetrafluoroethylene.

5. The oven defined in claim 1 wherein said bottom wall includes a removable panel, and said coating is provided on said removable panel.

6. The oven defined in claim 1 wherein said heating unit has a generally D-shaped cross section, with the flat portion of said D facing upwardly toward the main portion of said oven, and the curved portion of said D facing downwardly toward said bottom wall, and said baffle has a width very close to that of said heating unit.

References Cited

UNITED STATES PATENTS

| | | | |
|---|---|---|---|
| 2,799,766 | 7/1957 | Tuttle | 219—403 |
| 2,860,225 | 11/1958 | Steen | 219—399 |
| 3,162,753 | 12/1964 | Boyer | 219—403 |
| 3,334,215 | 8/1967 | Allen | 219—403 |

BERNARD A. GILHEANY, *Primary Examiner.*

H. B. GILSON, *Assistant Examiner.*